S. L. FISHER.
Gate-Way.

No. 164,986. Patented June 29, 1875.

WITNESSES
Mary P. Utley.
Fredk. J. Masi.

INVENTOR
Simeon L. Fisher
Chipman & Hosmer & Co.
ATTORNEY

THE GRAPHIC CO. PHOTO-LITH. 39 & 41 PARK PLACE, N.Y.

UNITED STATES PATENT OFFICE.

SIMEON L. FISHER, OF BRIMFIELD, ILL., ASSIGNOR OF TWO-THIRDS HIS RIGHT TO WEBSTER HUEY AND WILLIAM W. COWLES, OF SAME PLACE.

IMPROVEMENT IN GATEWAYS.

Specification forming part of Letters Patent No. 164,986, dated June 29, 1875; application filed January 2, 1875.

*To all whom it may concern:*

Be it known that I, SIMEON L. FISHER, of Brimfield, in the county of Peoria and State of Illinois, have invented a new and valuable Improvement in Entrance Ways or Gates; and I do hereby declare that the following is a full, clear, and exact description of the construction and operation of the same, reference being had to the annexed drawings making a part of this specification and to the letters and figures of reference marked thereon.

Figure 1:
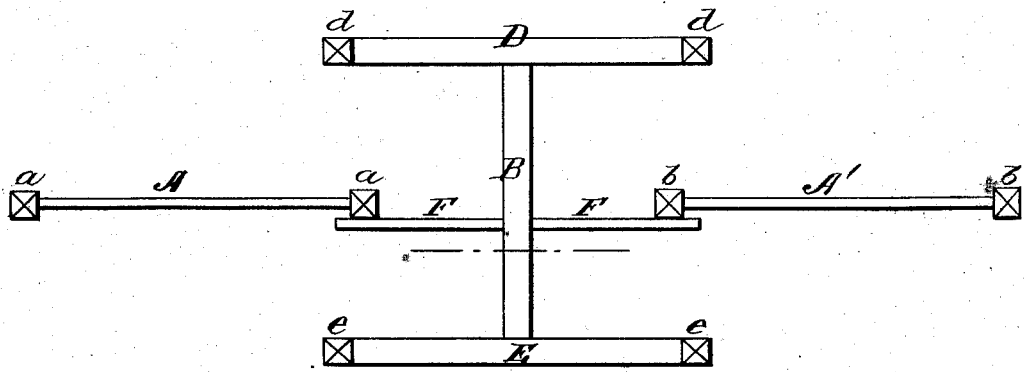
Figure 2:
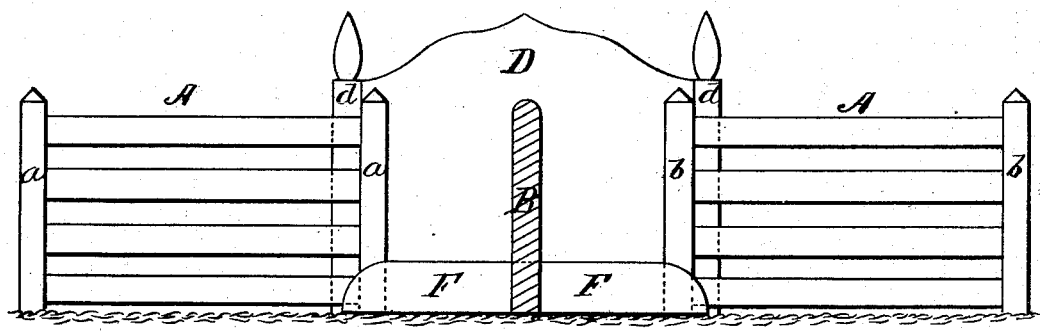

Figure 1 of the drawing is a representation of a top-plan view of my gate; and Fig. 2 is a front elevation, part sectional, of the same.

This invention has relation to devices which are designed for closing the gap in a fence giving entrance to a public square, cemetery, or other inclosure, so that persons may have a ready entrance, while animals shall be rigorously excluded; and the nature of the invention consists in combining with a partition centrally arranged in such a gap, vertical to the line of fence, a second partition arranged at each end of and vertical to the first, the same being of greater length than the gap and presenting a close front, whereby a short double turn is produced at each side of the central partition, effectually preventing animals from penetrating into the interior of the inclosure, while persons will be allowed to pass freely in or out, as will be hereinafter more fully explained.

In the annexed drawings, A A' designate two panels of fence bounding a gap or entrance way, which panels are sustained in a vertical position by means of posts *a b*. B designates a close partition, centrally arranged between posts *a b*, in a position vertical to the line of fence, its ends extending equally beyond each side of the fence, as shown in Fig. 1. B and E designate two close fronts rigidly secured in a vertical position to the partition B, and preferably of greater length than the gap, so that their ends may project equally beyond posts *a b* of the fence, as shown in Fig. 1. These partitions D E may be supported on posts *d e*, and are designed to be close—that is to say, to present a solid front—so that animals passing along a roadway may not be tempted to seek an entrance into the inclosure by the herbage within seen through an open front. By this means animals of large size, as horses, cows, and the like, are effectually excluded, owing to the fact that, in order to get in, two very short turns are requisite to be made at the same time, and that in such animals their peculiar structure does not admit of the same being simultaneously made.

Fronts D E may be of any suitable material, and of any degree of ornamentation, and, with a view to being readily seen at night, are preferably of greater height than the surrounding fence. They may, in parks and other like places of public resort, be indicated by a lamp, in which case the posts *d e* may be replaced by lamp-posts.

With a view to preventing the ingress of sheep, hogs, and other like small animals, I make use of a board or boards, F, extending across the gap between posts *a* and *b* and the central partition, B, as shown in Figs. 1 and 2.

Another material advantage gained by this construction is that two separate and independent passage-ways into the inclosure are obtained, by means of which persons passing out of and into it are prevented from meeting and interfering with each other, one passage-way being appropriated to those entering and the other to those leaving the same.

What I claim as new, and desire to secure by Letters Patent, is—

The combination, with a passage-way in a fence, of the close fronts D E, connected together by the central partition B, one of the fronts being within and the other without the fence, and extending beyond the passage-way, whereby a double short turn is made at each side of the partition B, substantially as and for the purpose described.

In testimony that I claim the above I have hereunto subscribed my name in the presence of two witnesses.

SIMEON L. FISHER.

Witnesses:
L. O. WILSON,
J. R. BOWMAN.